United States Patent [19]

Carlson

[11] 4,282,916
[45] Aug. 11, 1981

[54] EASILY MOUNTED ANTI-SKID TIRE CHAIN

[76] Inventor: Carl A. Carlson, 2839 Eddington Ave., Cornwells Heights, Pa. 19020

[21] Appl. No.: 144,234

[22] Filed: Apr. 28, 1980

[51] Int. Cl.³ .............................................. B60C 27/00
[52] U.S. Cl. ................................ 152/241; 24/68 TT; 24/69 TT; 152/219; 24/299; 24/375
[58] Field of Search ............... 152/219, 241, 242, 240, 152/239, 213 A, 216, 219; 24/68 CT, 68 TT, 69 TT, 73 A, 73 AC, 73 CE, 73 HH, 73 HL, 116 R; 254/246, 257, 258

[56] References Cited

U.S. PATENT DOCUMENTS

| 2,303,804 | 12/1942 | Waid | 152/241 X |
| 3,426,824 | 2/1969 | Mazzella | 152/242 |

Primary Examiner—William A. Powell
Assistant Examiner—Thomas Bokan
Attorney, Agent, or Firm—Joseph G. Denny, III; Peter J. Patane

[57] ABSTRACT

A tire chain assembly is provided with a quick connecting male and female fastener for easily securing together the inner circumferential chain on the inner side of the tire without the need for elevating the tire. The outer circumferential chain on the outer side of the tire is provided with a toggle type fastener for securing together the ends of the outer circumferential chain and tightening the outer circumferential chain abut the tire.

3 Claims, 7 Drawing Figures

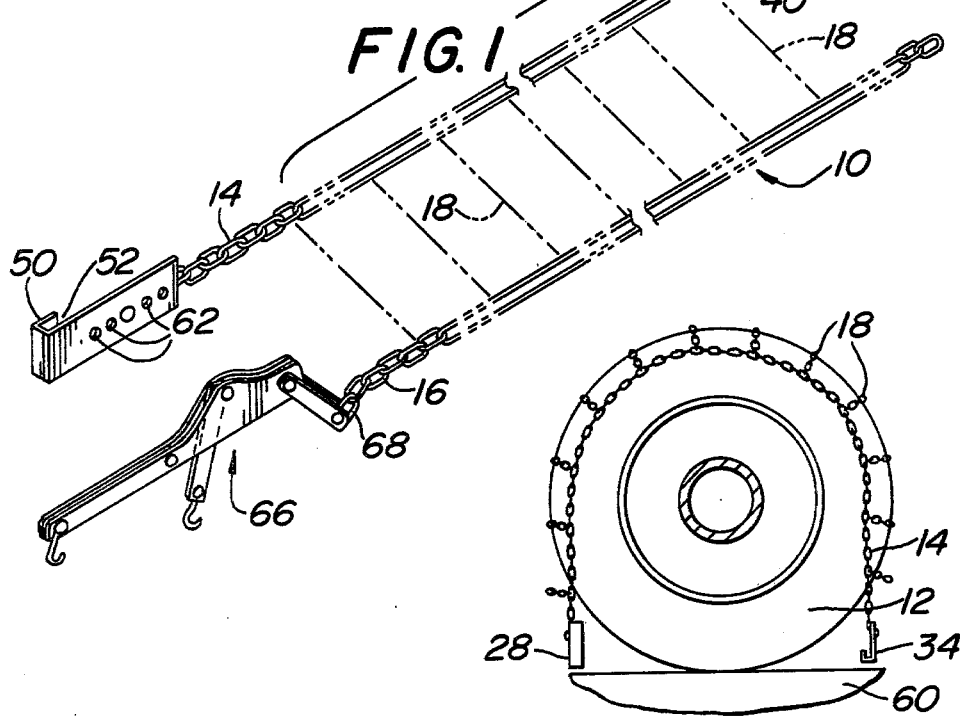

U.S. Patent  Aug. 11, 1981  Sheet 2 of 2  4,282,916
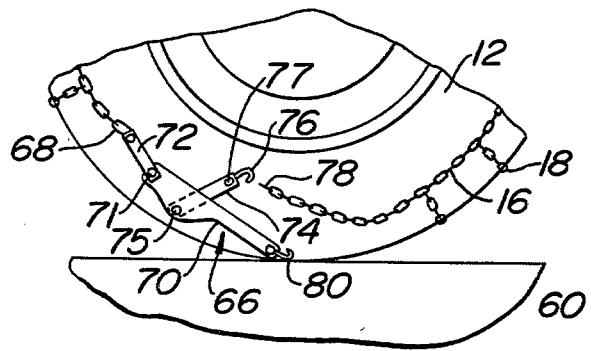
FIG. 5
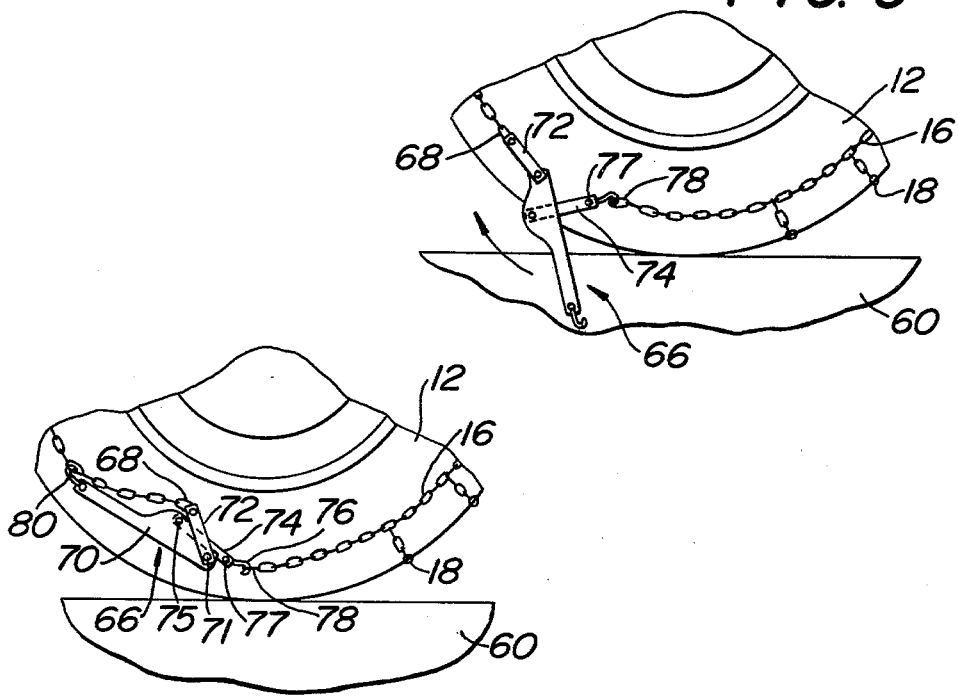
FIG. 6
FIG. 7

EASILY MOUNTED ANTI-SKID TIRE CHAIN

BACKGROUND OF THE INVENTION

This invention relates to anti-skid tire chain assemblies of the type that may be installed upon a tire without the need for elevating the tire from the surface upon which the tire rests when attached to a vehicle. One such tire chain assembly is shown in U.S. Pat. No. 3,616,830.

It is an object of this invention to provide a fastener attached to the opposite ends of the inner circumferential chain on the inner side of the tire which can be easily connected together and easily disconnected while the tire rests on its supporting surface or roadway.

It is a further object of this invention to provide an economical and convenient anti-skid tire chain assembly.

The foregoing and other objects of this invention, the principles of this invention, and the best modes in which I have contemplated applying such principles will more fully appear from the following description and accompanying drawings in illustration thereof.

BRIEF SUMMARY OF THE INVENTION

An easily attachable and easily detachable male-female connector is provided attached to the opposite ends of the inner circumferential tire chain.

The outer circumferential tire chain has a toggle device for tightening the chain assembly about the tire.

BRIEF DESCRIPTION OF THE VIEWS

In the drawings,

FIG. 1 is a top elevation view of the anti-skid tire chain assembly showing the cross links diagrammatically;

FIG. 2 is a rear elevation view of a tire and wheel assembly resting on a road surface with the chain assembly draped over the top of the tire;

FIG. 3 is a partial view similar to FIG. 2 but showing the male and female parts of the connector for the inner circumferential chain secured together;

FIG. 4 is a section view taken along the line 4—4 in FIG. 3;

FIG. 5 is a partial front elevation view showing the outer circumferential chain just prior to being connected together by the toggle device;

FIG. 6 is a view similar to FIG. 5 but showing the chain connected to the toggle device; and FIG. 7 is a view similar to FIGS. 5 and 6 but showing the toggle device in its locked position.

DETAILED DESCRIPTION

Referring to the drawings, FIG. 1 illustrates an anti-skid tire chain assembly 10 for a vehicle tire 12, FIG. 2. The tire chain assembly 10 comprises an inner circumferential chain 14 and an outer circumferential chain 16 connected together by a plurality of cross chains 18. The cross chains 18 are shown diagrammatically in FIG. 1.

The opposite end links 20 and 22 of the inner circumferential chain 14 are secured to a male-female connector 26. The connector 26 comprises a female part 28 secured to the link 20 by a suitable nut and bolt fastener 30. The connector 26 also includes a male part 34 secured to the link 22 by another suitable nut and bolt fastener 36.

The female part 28 has a channel shape, as best shown in FIG. 1, with the opposite sides 38 and 40 of the channel being bridged by a plate 42 to define with the base 44 and sides 38, 40 of the channel a space 46, FIG. 4.

The male part 34 includes an end lip 50 turned upon itself to form a U-shape and to define a space 52, as shown, the lip 50 being received in the space 46 of the female part 28 and the bridging plate 42 being recieved in the space 52. Thus, the female and male parts 28 and 34 interlock as shown in FIG. 4.

When the chain assembly 10 is to be added to the tire 12, the tire 12 resting on the road surface 60, the chain assembly 10 is draped over the top of the tire as shown in FIG. 2, which is a view of the inner side of the tire. One then reaches with his arms around the tire and grasps the female part 28 and the male part 34. The male part 34 is slid along the bridging plate 42 until the lip 50 passes the bridging plate 42 to enter the space 52. Preferably, the parts are proportioned so that snug fit is made between the lip 50 and the plate 42 causing the male and female parts 34 and 28 to lock together.

Preferably, the male and female parts 34 and 28 are provided with a plurality of holes 62, as shown, so that the bolts and nuts 30 and 36 may be placed in them to accommodate slightly different tire sizes.

The outer circumferential chain 16 has a toggle device 66 secured to a chain link 68 at one end of the chain 66. The toggle device 16 comprises a body 70 pivotally secured by pin 71 at one end to a lever 72. The lever 72 is secured at its opposite end to the chain link 68. The body 70 also has pivotally secured to it another lever 74 by pin 75 and the opposite end of the lever 74 carries a hook 76 at a pin 77 which grasps a chain link 78 carried by the opposite end of the chain 16.

After the hook 76 grasps the chain link 78, the right hand portion, as shown in FIG. 6, of the body 70 is rotated clockwise, whereby the body 70 pivots about its connection with the lever 72, transporting the lever 72 and the chain link 68 to the right, causing the circumferential chain 16 to tighten about the tire. The body 70 is rotated until the pivot pin 71 between it and the lever 72 moves below the centerline between the pivot pins 75 and 77 at which time the hook 80 is secured to one of the links of the chain 16, as shown in FIG. 7.

It will be noted that the sides 38 and 40 of the channel shaped female part 28 help to guide the lip 50 into engagement with the bridging plate 42 if the lip 50 is placed between the sides 38 and 40 and then the male and female parts 34 and 28 are moved away from each other to the position shown in FIG. 4.

What I claim is:

1. In an anti-skid tire chain assembly comprising
    a circumferential inner chain,
    a circumferential outer chain,
    cross chains connected to said inner and outer chains.
    the improvement comprising,
    a connector having a male part attached to one end of said inner chain and a female part attached to the opposite end of said inner chain,
    said male part including a lip turned upon itself to form a U-shape in cross section and defining a first space,
    said female part having sides and a base defining a channel shape and a bridging plate connecting said sides and defining a second space,
    said lip being guided into said second space by said sides and being received in said channel between said sides of said female part and within said second space, said bridging plate being snugly received in said first space, so as to lock said male and female parts together, and a toggle device attached to the opposite ends of said outer chain for tightening said outer chain about said tire.

2. The combination of claim 1 wherein said male and female parts have means to receive the ends of said inner chain at different locations so as to extend or contract said inner chain.

3. The combination of claims 1 or 2 wherein said toggle device includes a body, a first lever pivotally connected at one end to one end of said body, said first lever being connected at its other end to a first end of said outer chain, a second lever pivotally connected at one end to said body and to the second end of said outer chain at the other end of said second lever, said body being rotatable about its pivotal connection to said second lever so as to move said outer chain ends towards each other until the pivotal connection between said first lever and said body passes through the center line between the pivotal connection of said body to said second lever and the pivotal connection between said second lever and said second end of the outer chain, and a hook for connecting said body to said first end of said outer chain.

* * * * *